Sept. 24, 1929.  T. M. SHEVNIN  1,729,278
GAS AND AIR MIXER
Filed April 17, 1928  2 Sheets-Sheet 1
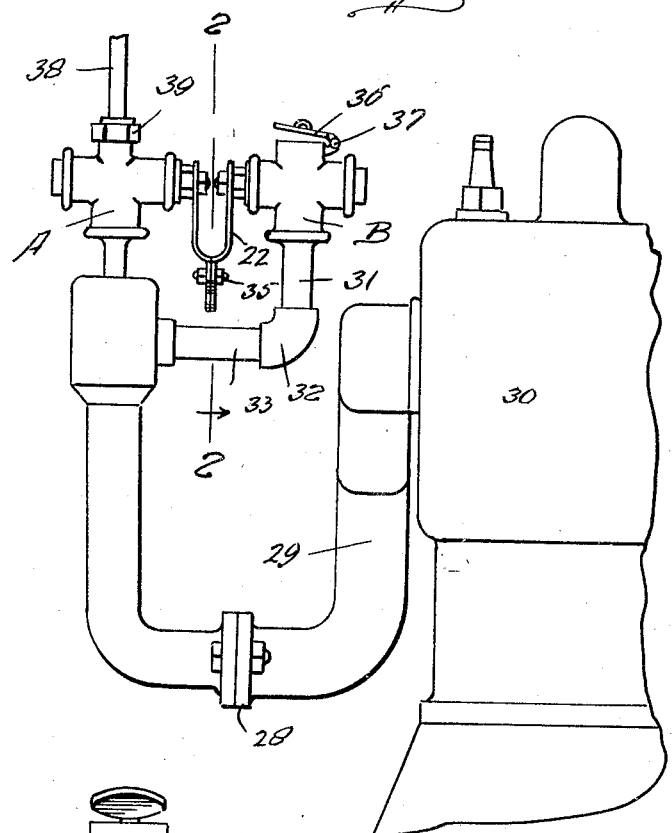

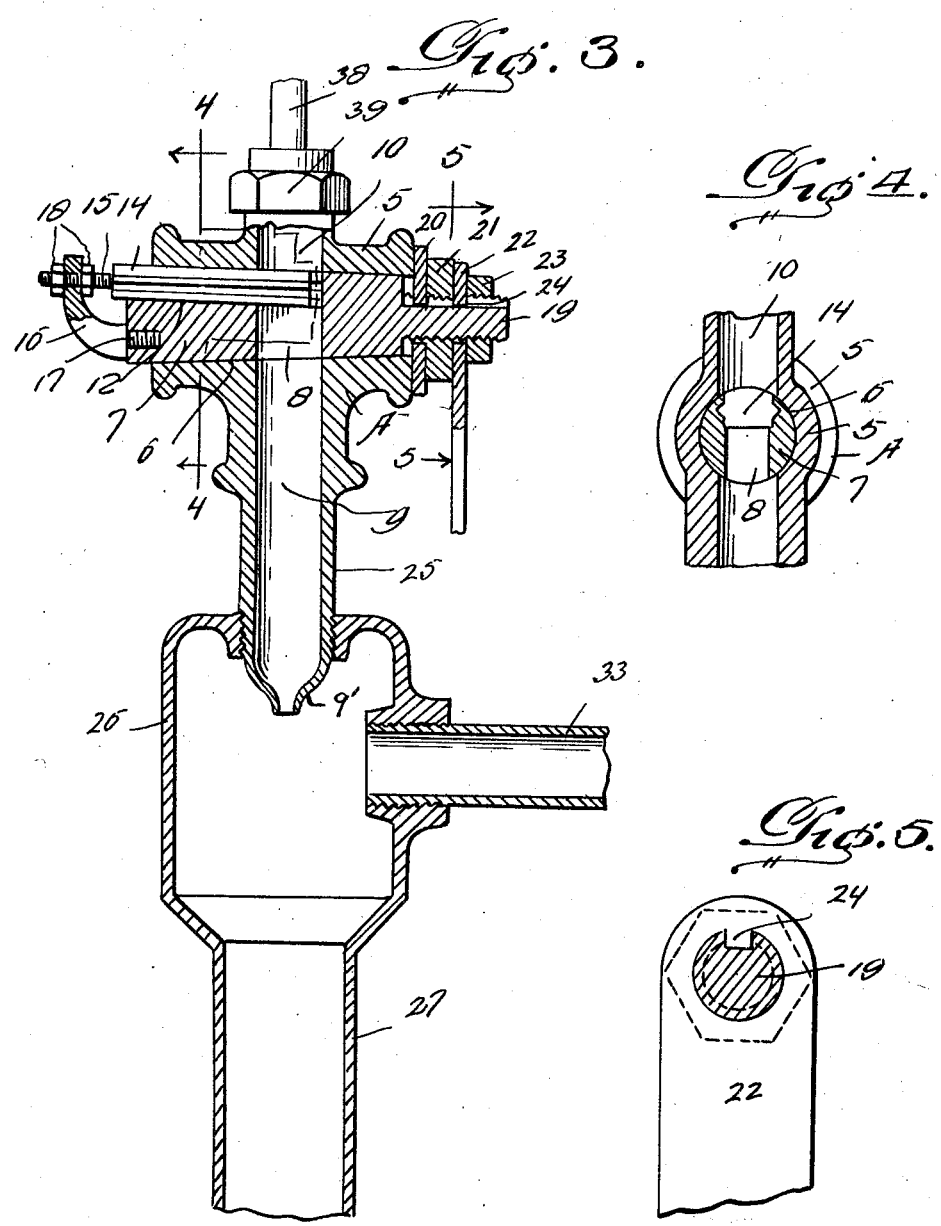

Patented Sept. 24, 1929

1,729,278

UNITED STATES PATENT OFFICE

THEUS MILES SHEVNIN, OF ALEXANDRIA, LOUISIANA

GAS AND AIR MIXER

Application filed April 17, 1928. Serial No. 270,786.

The present invention relates to an air and gas mixer and is particularly well adapted for use in conjunction with an internal combustion engine, although by no means limited to this particular use.

The objects and advantages of the invention will become quite apparent from the following description taken in conjunction with the accompanying drawings, wherein:

Figure 1 is an elevation of the device, showing the same on an internal combustion engine.

Figure 2 is a detail section taken substantially on the line 2—2 of Figure 1.

Figure 3 is a vertical section through the gas cock and mixing chamber.

Figure 4 is a detail section taken substantially on the line 4—4 of Figure 3, and Figure 5 is a detail section taken substantially on the line 5—5 of Figure 3.

Referring to the drawing in detail, it will be seen that the letter A denotes a gas cock and the letter B an air cock. These cocks are practically identical in construction, except for such differences as will be hereinafter pointed out. The cocks A and B comprise cruciform casings 5, with conical bores 6 extending therefrom for receiving tapered cores 7, which have transverse openings 8, registerable with openings 9 and 10 oppositely disposed in the casing.

The core 7 is provided with a bore 12, leading from the larger end thereof into the opening 8, and a slide valve 14 is slidable in this opening across the opening 8 and has at its outer end a reduced threaded shank 15 extending through a bracket 16, secured as at 17, on the larger end of the core 7, and adjusting nuts 18 are provided on the shank one to each side of the extremity of the brackets 16. The smaller end of the core has a reduced extension 19, on which is a washer 20, a nut 21, a crank 22, and a nut 23, in the order mentioned. The nut 21 adjusts the core in the bore 6, to compensate for any wear, while the nut 23 holds the crank in place which is keyed to the extension 19, as is indicated at 24.

The opening 9 of the valve A has a pipe extension 25 leading downwardly therefrom and threaded in the upper end of the mixing chamber 26, which merges into a depending L-shaped pipe 27, adapted to be coupled as at 28, with the intake manifold 29, of an internal combustion engine 30, in the present example of the utility of the structure. The valve B has a pipe 31, depending from its opening 9 and on the lower end of the pipe 31 there is engaged an elbow coupling 32, from which extends a pipe 33 threadedly tapped into one side of the chamber 26. The smaller ends of the cores of the valves A and B face each other.

The lower extremities of the cranks 22 are offset toward each other and secured together by a bolt 35, or in any other suitable manner. A flat valve 36 is hinged as at 37, on the valve casing 5 of the valve B for closing the opening 10 thereof for starting the engine this functioning as a choke. The gas line 38 is coupled as at 39, with the opening 10 of the valve A. It will thus be seen that the suction created by the internal combustion engine, through the intake manifold 29 and the pipe 27 will set up a suction through the mixing chamber 26, thus causing the gas to be cut through the pipe 38, against that portion of the slide valve 14 projecting through the opening 8 in the cut off valve A and to be mixed with air in the mixing chamber 26 which comes through the pipe 33, the elbow coupling 32, pipe 31 and through the valve B. The volume of gas and air passing through the pipes would flow freely through the transverse openings in the cores, but by means of adjusting the slide valves across the transverse openings the flow is restricted and, as desired, regulated in its passages. Obviously the proper mixture may be attained by adjusting the slide valves 14 in the parts A and B, thus necessitating no adjustment of the cores. Of course, the cores are adjustable by rocking the cranks 22, depending upon the speed desired. It will further be seen that an adjustment may be had by adjusting the cranks in relation to each other, as these cranks are provided with elongated arcuate slots 40 through which the bolt 35 extends. This gas and air mixer may be used in place of the usual gasoline carburetor on hydro-carbon engines, and an efficient performance will be attained thereby. There are numerous advantages derived from this air and gas mixture, the most important one being that the cost of the amount of gas used is much less than that of the ordinary carburetor. The dilution in the crank case of oil is reduced to a minimum. A perfect gaseous mixture is effected, not like that of an atomized mixture found in the case of gasoline which gives an easier and more complete combustion. It may be used to burn the gas directly in the engine. The structure is exceedingly simple, inexpensive to manufacture, strong and durable, thoroughly efficient and reliable in use and operation, and otherwise well adapted to the purpose for which it is designed.

The lower end of the pipe 25 has a tapered funnel shaped end and will blow the incoming gas across the incoming air at a rapid rate in the mixing chamber 26.

With the above and numerous other objects in view, as will appear to those skilled in the art after a study of this disclosure, the invention resides in certain novel features of construction and in the combination and arrangement of parts as will be hereinafter more fully claimed.

The present embodiment of the invention has been disclosed in detail merely by way of example, since in actual practice it attains the features of advantage enumerated as desirable in the statement of the invention and the above description.

It will be apparent that changes in the details of construction and in the combination and arrangement of parts may be resorted to, without departing from the spirit or scope of the invention as hereinafter claimed or sacrificing any of its advantages.

Having thus described my invention, what I claim as new is:

1. An air and gas mixing device comprising in combination, a mixing chamber, a pipe rising from the mixing chamber, a valve casing on the pipe, a pipe leading laterally from the mixing chamber and terminating in a riser, a valve casing on the riser, a rotatable core mounted in the respective valve casings and provided with transverse openings, slide valves in the cores and adapted to extend across the transverse openings, means for adjusting the slide valves, means for operating the cores simultaneously, means for adjusting the cores relative to each other and a flat valve hingedly connected with the valve casing on the riser at the intake thereof.

2. An air and gas mixing device comprising in combination, a mixing chamber provided with a pair of inlets and an outlet, a gas pipe and an air pipe connected to the respective inlets, a pipe leading from said outlet and adapted to be connected with an internal combustion engine, valve casings having oppositely disposed openings and being mounted on the gas and air pipes respectively, each of said casings having a conical bore extending therethrough, tapered cores rotatable in the bores, and having transverse openings registrable with the openings in the casings, a slide valve carried by the cores and adapted to extend across said transverse openings, said valves being adjustable to regulate the flow of the respective fluids into the said mixing chamber, crank members keyed to the cores at their respective smaller ends, the free ends of said cranks being offset, and adapted for connecting together thereat, for simultaneously adjusting said cores, means for adjusting said cranks relative to each other, and a flat valve hingedly connected to said air valve casing at one opening thereof, said valve adapted to function as a choke.

In testimony whereof I affix my signature.

THEUS MILES SHEVNIN.